(12) United States Patent　　　(10) Patent No.: US 12,645,786 B2

Paris et al.　　　(45) Date of Patent: Jun. 2, 2026

(54) SUBSYSTEM PERMISSION ERROR DIAGNOSTIC AID

(71) Applicant: Red Hat, Inc., Raleigh, NC (US)

(72) Inventors: Eric Paris, Raleigh, NC (US); Giuseppe Scrivano, Milan (IT); Daniel Walsh, Augusta, GA (US)

(73) Assignee: Red Hat, Inc., Raleigh, NC (US)

( * ) Notice: Subject to any disclaimer, the term of this patent is extended or adjusted under 35 U.S.C. 154(b) by 196 days.

(21) Appl. No.: 18/241,710

(22) Filed: Sep. 1, 2023

(65) Prior Publication Data

US 2025/0077652 A1　　Mar. 6, 2025

(51) Int. Cl.
*G06F 21/55* (2013.01)

(52) U.S. Cl.
CPC .......... *G06F 21/552* (2013.01); *G06F 21/554* (2013.01)

(58) Field of Classification Search
CPC .............................. G06F 21/552; G06F 21/554
See application file for complete search history.

(56) References Cited

U.S. PATENT DOCUMENTS

| | | | |
|---|---|---|---|
| 9,804,952 | B1 | 10/2017 | Cohen et al. |
| 12,267,345 | B1 * | 4/2025 | Erlingsson ............ G06F 9/5072 |
| 2022/0350676 | A1 | 11/2022 | Tamir et al. |
| 2023/0161867 | A1 | 5/2023 | Feist et al. |
| 2023/0254330 | A1 * | 8/2023 | Singh .................... G06F 11/323 726/23 |
| 2023/0275917 | A1 * | 8/2023 | Karmali .............. G06F 16/9537 709/224 |

| | | | |
|---|---|---|---|
| 2024/0303324 | A1 * | 9/2024 | Melgarejo Lermas .. G06N 5/04 |
| 2024/0340266 | A1 * | 10/2024 | van der Merwe .. H04L 63/0263 |
| 2025/0061053 | A1 * | 2/2025 | Hecht ................. G06F 11/3698 |

OTHER PUBLICATIONS

"Troubleshooting eBPF", extended Berkeley Packet Filter, 2016, 4 pages, accessed on: Aug. 31, 2023, accessed at: https://prototype-kernel.readthedocs.io/en/latest/bpf/troubleshooting.html.
Mauricio Vásquez Bernal, "Extending Systemd Security Features with eBPF", Apr. 9, 2021, 13 pages.
"8.6 Release Notes—Red Hat Customer Content Services", Red Hat, Inc., 2023, 231 pages.
"Bpf-Linux Manual Page" Linux/UNIX system programming training, accessed on Aug. 31, 2023, accessed at: https://man7.org/linux/man-pages/man2/bpf.2.html, 16 pages.
"Berkeley Packet Filter: Theory, Practice and Perspectives", Alma Mater Studiorum—Universita di 'Bologna, 126 pages.

* cited by examiner

*Primary Examiner* — Linglan Edwards
*Assistant Examiner* — Kamryn J Gillespie
(74) *Attorney, Agent, or Firm* — Kilpatrick Townsend & Stockton LLP

(57) ABSTRACT

Systems, methods, and apparatuses for determining a cause of an error in a computing environment, such as a permission denied error in a linux computing environment, are provided herein. An example method comprises executing an application in a linux environment, monitoring a plurality of linux subsystems and functions via an instrumentation inserted on a kernel, and responsive to a failure of the application, providing a summary of a cause of the failure based upon the monitoring of the linux subsystems and functions.

17 Claims, 5 Drawing Sheets

100

200

Execute an application in a linux environment
202

Monitor a plurality of linux subsystems and functions via an
instrumentation inserted on a kernel
204

Provide a summary of a cause of the failure based upon the monitoring
of the linux subsystems and functions responsive to a failure of the
application
206

300

400

410

420

430

440

450

Summary of failure     − □ X

Time of failure:     01:43.032
Cause of failure:     EPERM – Permission denied
Last subsystem or function call:     Example_subsystem
Last subsystem or function action:     Write to file
Denied permission:     Write access denied

SUBSYSTEM PERMISSION ERROR DIAGNOSTIC AID

BACKGROUND

In computing systems, particularly those that utilize the linux kernel, permissions are required to perform certain actions such as terminating a process a user doesn't own, rebooting the system, or deleting certain files. These permissions are necessary to maintain security and stability within a system, and disabling them introduces significant security vulnerabilities. Functions are sections of code which can be referenced and executed by applications. Functions often accept one or more input variables and return one or more output values. Linux subsystems are components of and additions to the linux kernel which perform specific tasks, including but not limited to a system call interface, a process manager, a virtual file system, a memory manager, a network stack, architecture-dependent components of the kernel, and device drivers. Applications and functions may make calls to linux subsystems when tasks interacting with hardware or underlying infrastructures (e.g. a file system) are executed.

SUMMARY

Systems, methods, and apparatuses are provided for determining a cause of an error in a computing environment, such as a permission denied error in a linux computing environment. In an example, a method comprises executing an application in a linux environment, monitoring a plurality of linux subsystems and functions via an instrumentation inserted on a kernel, and responsive to a failure of the application, providing a summary of a cause of the failure based upon the monitoring of the linux subsystems and functions.

In another example, a system comprises a memory and a processing device, operatively coupled to the memory, to execute an application in a linux environment, monitor a plurality of linux subsystems and functions via an instrumentation inserted on a kernel, and responsive to a failure of the application, provide a summary of a cause of the failure based upon the monitoring of the linux subsystems and functions.

In yet another example, a non-volatile machine-readable medium stores instructions which, when executed by a processing device, cause the processing device to execute an application in a linux environment, monitor a plurality of linux subsystems and functions via an instrumentation inserted on a kernel, and responsive to a failure of the application, provide a summary of a cause of the failure based upon the monitoring of the linux subsystems and functions.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter.

BRIEF DESCRIPTION OF THE DRAWINGS

The description will be more fully understood with reference to the following figures, which are presented as exemplary aspects of the disclosure and should not be construed as a complete recitation of the scope of the disclosure, wherein.

DETAILED DESCRIPTION

Figure 1:
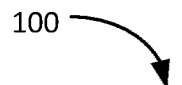
FIG. 1 illustrates an example containerized linux computing system, according to example embodiments of the present disclosure.
Figure 1:
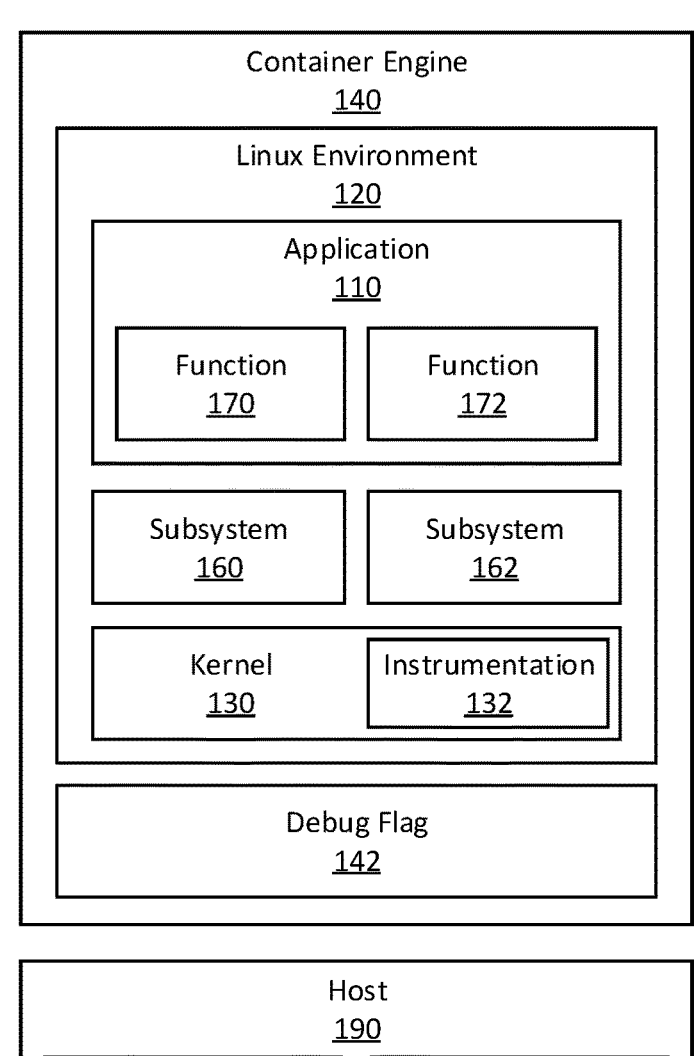

Techniques are disclosed herein for determining a cause of an error in a computing environment, such as a permission denied error in a linux computing environment. Users of linux environments may perform operations via one or more applications containing functions. These functions may be referenced and called by one or more applications, and may perform a variety of tasks, including but not limited to performing mathematical operations, transforming data, and calling linux subsystems. Linux subsystems may be portions of the linux kernel which perform tasks including but not limited to reading from and writing to storage and/or memory, interacting with peripheral devices, handling network communications, interacting directly with system hardware, and scheduling threads.

Many computing environments, including those which run on the linux kernel, utilize a system of permissions for preventing unauthorized data access, process termination, file execution, and other actions which can negatively impact the security or stability of the computing environment. In most scenarios, these permissions operate in the background in such a way that many users may not even be aware of the existence of the permissions. A particular use case where these permissions can prove problematic, however, is software development.

When a user attempts to perform an operation for which that user or application lacks the necessary permissions, the standard response of the linux kernel is to return a message stating "Permission Denied" or "Operation Not Permitted" without additional detail regarding a cause of the error. This is because Unix-like operating systems (e.g. linux) implement a standard operating system interface called the Portable Operating System Interface (POSIX) which limits error reporting to a single integer as a legacy of early Unix implementations which were quite simple compared to the modern linux kernel. The lack of detail in error reporting can lead to difficulty in diagnosing problems in software development, however, since a simple "Permission Denied" error can snowball into hours or days of searching for a cause when an application in development is sufficiently large and complex. Attempts to extract more detail from the kernel often cause a "Permission Denied" race, in which.

A common solution to this problem is to simply execute software as a root user. This is generally considered to be a poor practice because numerous stability and security vulnerabilities can result, but is nevertheless sometimes preferable to spending copious amounts of time tracking down a cause of the error. Such an approach does not solve potential permission errors encountered once the software being developed reaches distribution, however, and expecting end users to execute an application as a root user without a compelling need is likewise a poor practice.

Methods, systems, and apparatuses of the present disclosure aim to provide an alternative solution. Various technologies exist that can be adapted to monitor activities of processes and/or linux subsystems in a computing environment, and these can be used to record a history of activities leading up to a permission error. Upon detection of a permission error, a system can be configured to store a predetermined quantity of preceding actions taken by a plurality of subsystems and functions and compile a summary of a likely cause of the permission error for presentation to a user. In this way, significant reductions in the debugging time for permission errors can be achieved without compromising security or stability of host systems. This instrumentation can further be incorporated into a container engine. The container engine may execute software within a containerized instance, and when initiated with a debug flag set, may record actions and generate failure summaries as described above.

FIG. 1 illustrates an example containerized linux computing system 100, according to example embodiments of the present disclosure. An application 110 includes a first function 170 and a second function 172. The application 110 executes within a linux environment 120 that includes a first subsystem 160, a second subsystem 162, and a kernel 130. Instrumentation 132 is inserted onto the kernel 130 in order to detect and record events such as actions taken by the first subsystem 160, the second subsystem 162, the first function 170, and the second function 172. The linux environment 120 executes in a container engine 140 that has a debug flag 142 to enable or disable the instrumentation 132. The container engine 140 executes on a host 190 that includes a processing device 150 and memory 180.

It will be appreciated that the example containerized linux computing system 100 is one of a wide range of possible configurations for a containerized linux computing environment. It will also be appreciated that the example containerized linux computing system 100 has been simplified for illustrative purposes, and that in practice many additional functions, applications, and subsystems may execute in the linux environment 120. Additionally, the container engine 140 may execute multiple linux environments 120 at once, and these linux environments 120 may share a single kernel 130. Further, the host 190 may be a distributed computing system such as a serverless computing environment, a cloud computing system, or any other system capable of executing machine-readable instructions. The linux environment 120 need not be containerized, and may run directly on the host 190.

Figure 2:
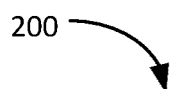
FIG. 2 illustrates a flowchart of an example method for determining a cause of an error in a linux computing environment, according to example embodiments of the present disclosure.
Figure 2:
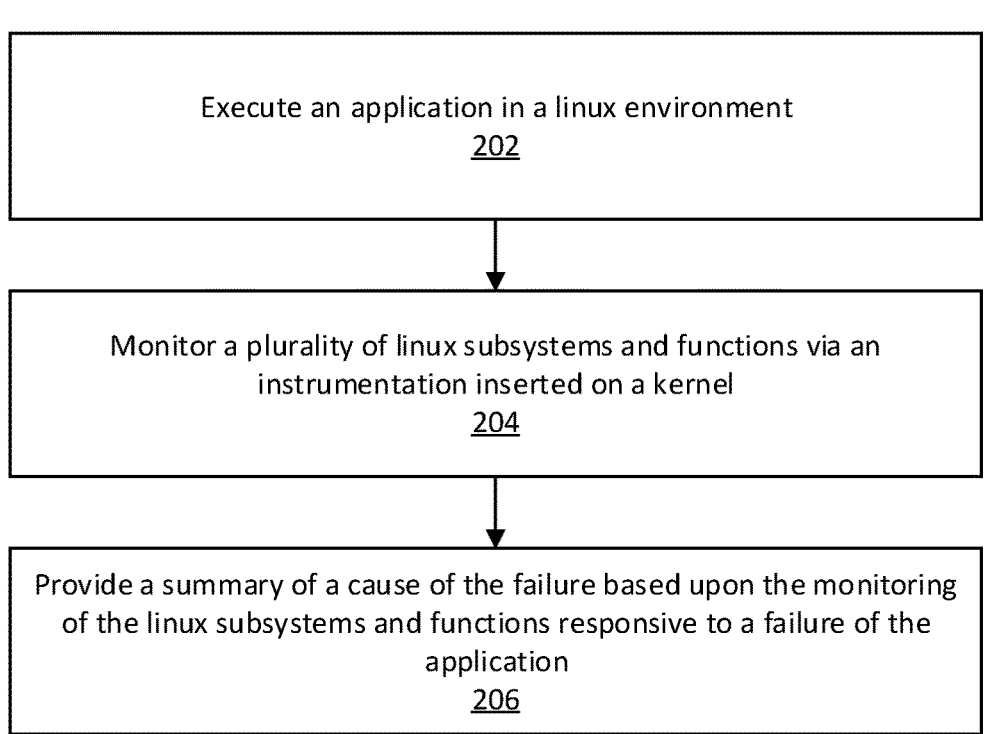

FIG. 2 illustrates a flowchart of an example method 200 for determining a cause of an error in a linux computing environment, according to example embodiments of the present disclosure. It will be appreciated that the method 200 is presented for illustrative purposes only and is not intended to be limiting. The method 200 is additionally presented with a high level of abstraction, and actual embodiments may include additional steps which are not discussed herein.

At block 202, an example processing device executes an application in a linux environment. For example, a processing device 150 of a computing cluster may execute an in-development accounting application 110 in a container running linux (the linux environment 120) executing on a cloud computing network.

At block 204, an example container engine monitors a plurality of linux subsystems and functions via an instrumentation inserted on a kernel. For example, the processing device 150 may execute the container running linux (the linux environment 120) with Red Hat's Podman container engine 140 with an extended Berkeley Packet Filter (eBPF) implementation (the instrumentation 132) running on the kernel 130 to monitor linux subsystems (the first subsystem 160 and the second subsystem 162) and functions (the first function 170 and the second function 172) of the accounting application 110.

In some embodiments, the instrumentation 132 may monitor conditions of the linux environment 120 rather than subsystems and/or functions. For example, every linux command returns a "true" or "false" value as an exit condition corresponding to a success or failure of the command to execute. By monitoring and recording these exit conditions, a similar effect can be achieved to that which is possible by monitoring subsystems and functions.

At block 206, the container engine provides a summary of a cause of a failure based upon the monitoring of the linux subsystems and functions responsive to a failure of the application. For example, the Podman container engine 140 may be configured to analyze fifty actions taken prior to the failure to determine a likely cause, then generate and present a summary of the determined cause to a user along with a listing of the actions analyzed.

The Podman container engine 140 may be configured with a debug flag 142 that enables or disables the eBPF implementation when set. It will also be appreciated that any container engine 140 and any instrumentation 132 may be employed in the method 200, and that Podman and eBPF are provided merely as examples for illustrative and educational purposes.

Figure 3:
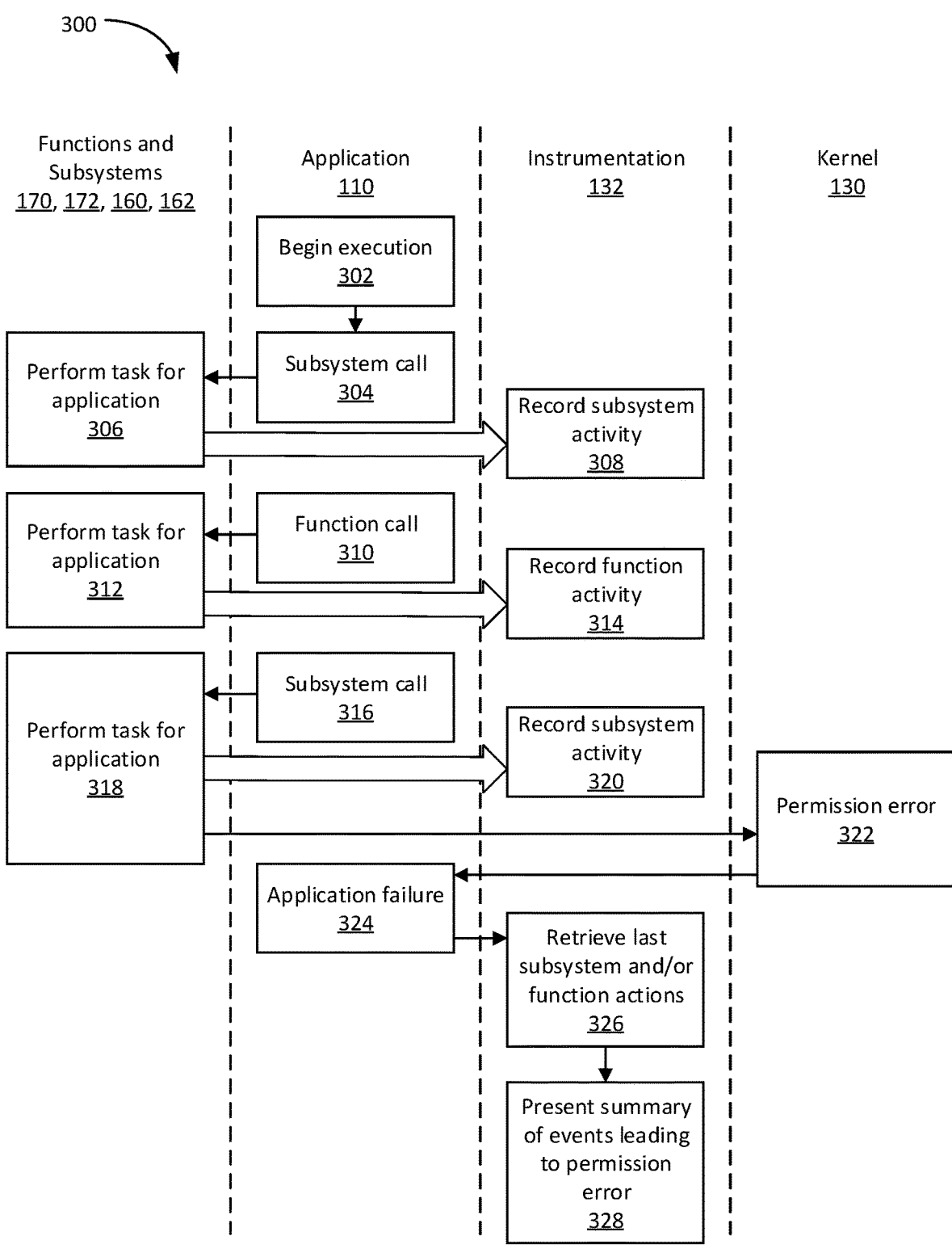
FIG. 3 illustrates a timing diagram of an example system for determining a cause of an error in a linux computing environment, according to example embodiments of the present disclosure.

FIG. 3 illustrates a timing diagram 300 of an example system for determining a cause of an error in a linux computing environment, according to example embodiments of the present disclosure. It will be appreciated that the timing diagram 300 is presented for illustrative purposes only and is not intended to be limiting. The timing diagram 300 is additionally presented with a high level of abstraction, and actual embodiments may include additional actions which are not discussed herein.

An example cartography application 110 begins execution in a linux environment 120 (block 302). The linux environment 120 may execute directly on a host 190 with no containerization. During execution, the cartography application 110 makes a first subsystem call (block 304) to a first subsystem 160 that draws images on a display. The first subsystem 160 receives image data of a map from the cartography application 110 and outputs the image data to the display (block 306). While this is occurring, an instrumentation 132 (e.g. an event recorder running on the kernel 130) monitors and stores records of actions taken by the first subsystem 160 (block 308). The first subsystem 160 finishes drawing to the display, and the cartography application 110 continues execution.

The cartography application 110 then makes a first function call (block 310) to a first function 170 that calculates a distance between two points on the map that has been drawn to the display. The first function 170 receives coordinate data of each point and then calculates a distance between the two points (block 312). While this is occurring, the instrumentation 132 monitors and stores records of actions taken by the first function 170 (block 314). The first function 170 returns a distance value, and the cartography application 110 continues execution.

The cartography application 110 then makes a second subsystem call (block 316) to a second subsystem 162 that attempts to terminate a process not belonging to the cartography application 110 (block 318). The second subsystem 162 receives an identifier of the process to be terminated and attempts to terminate the process (block 318). While this is occurring, the instrumentation 132 monitors and stores records of actions taken by the second subsystem 162 (block 318). Since the cartography application 110 lacks permissions to terminate a process that doesn't belong to the cartography application 110, the actions taken by the second subsystem 162 trigger a permission error (block 322) in the kernel 130. The permission error in turn causes a failure of the cartography application 110 (block 324).

The failure of the cartography application 110 causes the instrumentation 132 to retrieve a predetermined number of actions (block 326) of the first subsystem 160, the first function 170, and the second subsystem 162 leading up to the failure of the cartography application 110. The instrumentation 132 or associated software may then generate a summary of a cause of the failure of the cartography application 110. For example, the instrumentation 132 or associated software may inspect the actions of the first subsystem 160, the first function 170, and the second subsystem 162 leading up to the failure of the cartography application 110 and determine that one of the actions (the attempt to terminate the process by the second subsystem 162) which occurred close to a time of failure is an action which commonly causes permission errors to occur. The instrumentation 132 or associated software may generate the summary of the cause of failure based upon this determination, and may present the summary (block 328) to a user. The instrumentation 132 or associated software may also generate a log file containing a listing of recorded actions leading up to the failure.

Figure 4:
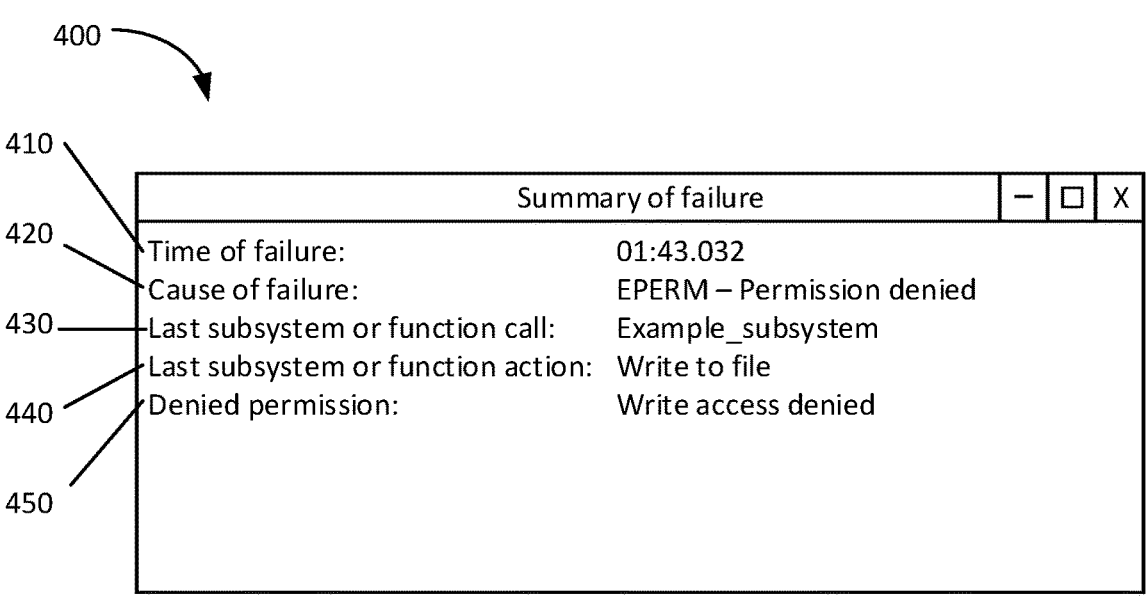
FIG. 4 illustrates an example summary of a cause of an error in a linux computing environment, according to example embodiments of the present disclosure.

FIG. 4 illustrates an example summary 400 of a cause of a permission denied error in a linux computing environment, according to example embodiments of the present disclosure. The example summary 400 includes a time of failure 410, measured in minutes, seconds, and thousandths of a second from an initial execution time, a cause of failure 420 listing an error code returned by a kernel 130, a last subsystem or function to execute 430, a last subsystem or function action 440, and a probable denied permission 450 determined based upon recorded actions leading up to the failure. The summary 400 may include additional elements not depicted herein, including but not limited to a listing of events prior to the failure, a listing of other possible denied permissions and/or a listing of relative probabilities of various denied permissions.

The summary 400 may be presented as depicted in a dialogue window, and/or may be written to a log file for later analysis by a user. The summary 400 may also exclude one or more elements depicted herein. For example, the summary 400 may omit the last subsystem or function to execute 430. Certain elements may be calculated differently than presented herein. For example, the time of failure 410 may be an absolute time of failure in coordinated universal time (UTC).

Figure 5:
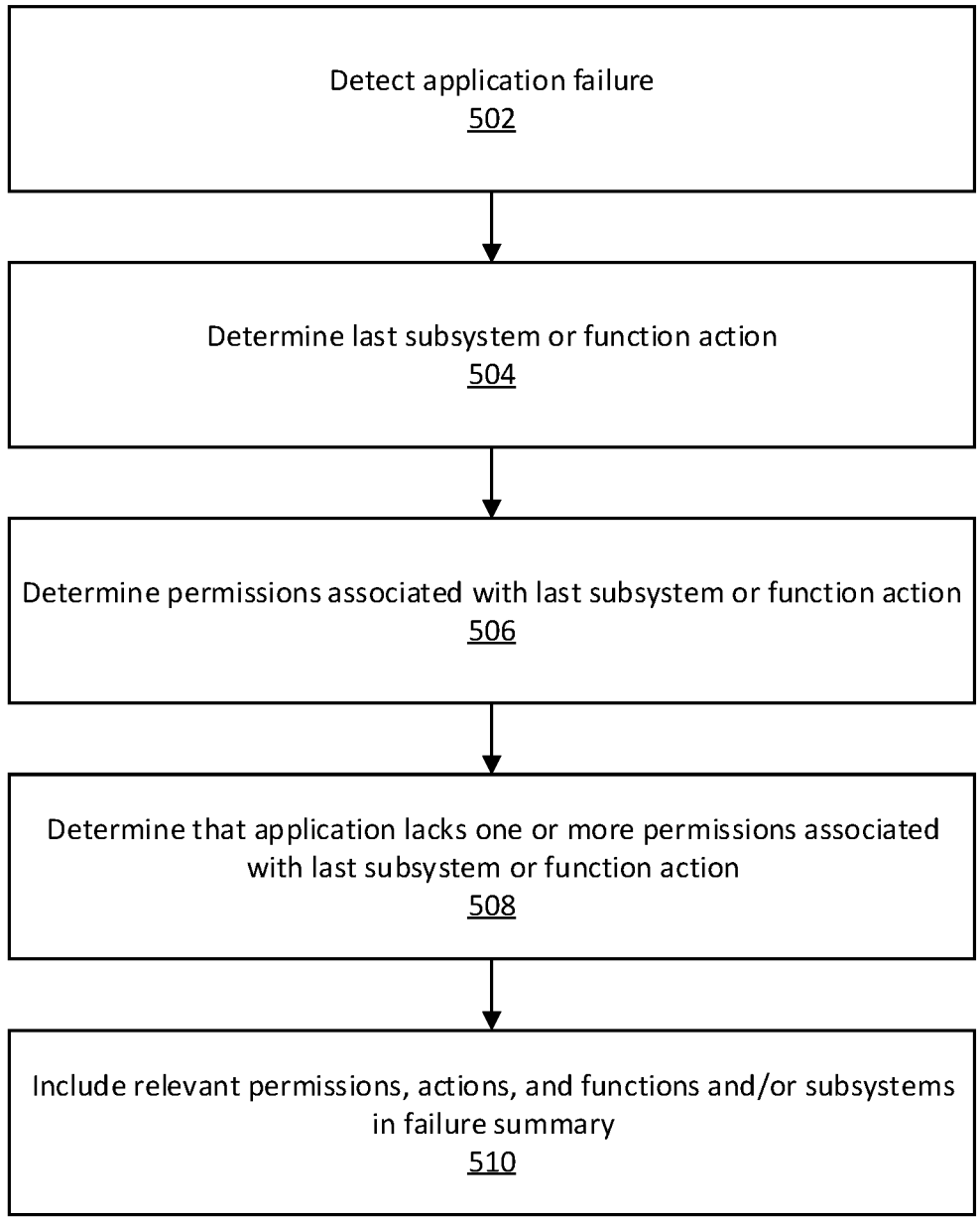
FIG. 5 illustrates a flowchart of an example method for determining a cause of and generating a summary of an error in a linux computing environment, according to example embodiments of the present disclosure.

FIG. 5 illustrates a flowchart of an example method 500 for determining a cause of and generating a summary of a permission denied error in a linux computing environment, according to example embodiments of the present disclosure. It will be appreciated that the method 500 is presented for illustrative purposes only and is not intended to be limiting. The method 500 is additionally presented with a high level of abstraction, and actual embodiments may include additional actions which are not discussed herein.

At block 502, an example instrumentation inserted on a kernel detects an application failure. For example, an extended Berkeley Packet Filter (eBPF) implementation (the instrumentation 132) may detect a permission denied (EPERM) error being returned by a linux kernel 130 executing a 3D modelling application 110 in a container (the linux environment 120). The 3D modelling application 110 may first execute in the container (the linux environment 120) without a flag enabling the eBPF implementation (the instrumentation 132) set. Responsive to a first failure of the 3D modelling application 110, a container engine 140 in which the container (the linux environment 120) may be configured to re-execute the 3D modelling application 110 with the flag enabling the eBPF implementation (the instrumentation 132) set.

At block 504, an example container engine determines a last subsystem or function action. For example, an instance of Red Hat's OpenShift CRI-O engine (the container engine 140) may consult records collected by the eBPF implementation (the instrumentation 132) determine that a function which writes a value to a file (the first function 170) was the last function or subsystem to execute before the failure and that the last action performed by the first function 170 was an attempt to write to a file.

At block 506, the example container engine determines one or more permissions associated with the last subsystem or function action. For example, the OpenShift CRI-O engine (the container engine 140) may consult a lookup table containing actions with associated permissions and determine that the attempted write action requires that a user be an owner of the file or a root user.

At block 508, the example container engine determines that the application lacks one or more permissions associated with the last subsystem or function action. For example, the OpenShift CRI-O engine (the container engine 140) may determine that the file that the first function 170 attempted to write to is not owned by a user who is executing the 3D modelling application 110 and that the user is not a root user, therefore the first function 170 lacks write permissions for the file.

At block 510, the example container engine includes relevant permissions, actions, and functions and/or subsystems in a failure summary. For example, the OpenShift CRI-O engine (the container engine 140) may generate and present to a user a summary indicating that an EPERM error was caused by an attempt by the first function 170 to write to the file owned by a different user, and that the file is configured with write permissions that prohibit users other than an owner and a root user from writing.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as infrastructure processing units (IPUs), graphical processing units (GPUs), data processing units (DPUs), ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

What is claimed:

1. A method, comprising:
executing an application in a computing environment;
monitoring a plurality of computing subsystems and a plurality of functions via an instrumentation inserted on a kernel to identify a plurality of actions performed by the plurality of computing subsystems and the plurality of functions;
recording the plurality of actions performed by the plurality of computing subsystems and the plurality of functions; and
responsive to a failure of the application:
determining an action of the plurality of actions that occurred just prior to the failure of the application;
identifying a permission corresponding to the action;
based on identifying the permission corresponding to the action, determining that the permission is a denied permission that caused the failure of the application; and
providing a summary of a cause of the failure, the summary comprising the denied permission.

2. The method of claim 1, wherein the executing takes place in a containerized computing environment.

3. The method of claim 2, wherein the containerized computing environment runs in a container engine, and wherein the monitoring is responsive to a debug flag being set to active in the container engine.

4. The method of claim 1, wherein the failure of the application is caused by a permission denied error.

5. The method of claim 1, wherein the summary further includes a computing subsystem of the plurality of computing subsystems that caused the failure.

6. The method of claim 1, further comprising determining a computing subsystem of the plurality of computing subsystems that caused the failure based upon the action of the plurality of actions that occurred just prior to the failure of the application.

7. The method of claim 1, wherein the instrumentation includes an extended Berkeley Packet Filter (eBPF) implementation.

8. A system, comprising:
a memory; and a processing device, operatively coupled to the memory, to:
execute an application in a computing environment;
monitor a plurality of computing subsystems and a plurality of functions via an instrumentation inserted on a kernel to identify a plurality of actions performed by the plurality of computing subsystems and the plurality of functions;
record the plurality of actions performed by the plurality of computing subsystems and the plurality of functions; and
responsive to a failure of the application;
determine an action of the plurality of actions that occurred just prior to the failure of the application;
identify a permission corresponding to the action;
based on identifying the permission corresponding to the action, determine that the permission is a denied permission that caused the failure of the application; and
provide a summary of a cause of the failure, the summary comprising the denied permission.

9. The system of claim 8, wherein the failure of the application is caused by a permission denied error.

10. The system of claim 8, wherein the summary further includes a computing subsystem of the plurality of computing subsystems that caused the failure of the application.

11. The system of claim 8, wherein the processing device is further operatively coupled to the memory to determine a computing subsystem of the plurality of computing subsystems that caused the failure based upon the action of the plurality of actions that occurred just prior to the failure of the application.

12. The system of claim 8, wherein the instrumentation includes an extended Berkeley Packet Filter (eBPF) implementation.

13. A non-transitory machine-readable medium storing instructions which, when executed by a processing device, cause the processing device to:
execute an application in a computing environment;
monitor a plurality of computing subsystems and a plurality of functions via an instrumentation inserted on a kernel to identify a plurality of actions performed by the plurality of computing subsystems and the plurality of functions;
record the plurality of actions performed by the plurality of computing subsystems and the plurality of functions; and
responsive to a failure of the application:
determine an action of the plurality of actions that occurred just prior to the failure of the application;
identify a permission corresponding to the action;
based on identifying the permission corresponding to the action, determining that the permission is a denied permission that caused the failure of the application; and
provide a summary of a cause of the failure, the summary comprising the denied permission.

14. The non-transitory machine-readable medium of claim 13, wherein the failure of the application is caused by a permission denied error.

15. The non-transitory machine-readable medium of claim 13, wherein the summary further includes a computing subsystem that caused the failure.

16. The non-transitory machine-readable medium of claim 13, wherein the instructions, when executed by the processing device, further cause the processing device to determine a computing subsystem of the plurality of computing subsystems that caused the failure based upon the action of the plurality of actions that occurred just prior to the failure of the application.

17. The non-transitory machine-readable medium of claim 13, wherein the instrumentation includes an extended Berkeley Packet Filter (eBPF) implementation.

\* \* \* \* \*